(«12») United States Patent
Loeb et al.

(10) Patent No.: US 9,352,613 B2
(45) Date of Patent: May 31, 2016

(54) EASILY MOUNTABLE SPOKE MODULE FOR THE SPOKES OF A WHEEL FOR MOTOR VEHICLES

(71) Applicant: GM GLOBAL TECHNOLOGY OPERATIONS LLC, Detroit, MI (US)

(72) Inventors: Niels Loeb, Wiesbaden (DE); Darren Luke, Weisbaden (DE); Franz Schwenk, Freudenstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 628 days.

(21) Appl. No.: 13/653,596

(22) Filed: Oct. 17, 2012

(65) Prior Publication Data

US 2013/0099555 A1 Apr. 25, 2013

(30) Foreign Application Priority Data

Oct. 19, 2011 (DE) .......................... 10 2011 116 359

(51) Int. Cl.
 *B60B 7/08* (2006.01)
 *B60B 7/04* (2006.01)
 *B60B 7/06* (2006.01)

(52) U.S. Cl.
 CPC ... *B60B 7/08* (2013.01); *B60B 7/04* (2013.01); *B60B 7/065* (2013.01); *B60B 2360/104* (2013.01); *B60B 2360/30* (2013.01); *B60B 2900/572* (2013.01)

(58) Field of Classification Search
 CPC .............. B60B 7/04; B60B 7/08; B60B 7/065
 See application file for complete search history.

(56) References Cited

U.S. PATENT DOCUMENTS

| | | | |
|---|---|---|---|
| 4,438,979 A | 3/1984 | Renz et al. | |
| 6,247,760 B1 | 6/2001 | Kinoshita | |
| 7,618,099 B1 | 11/2009 | Acosta | |
| 8,201,894 B2 * | 6/2012 | Chinavare et al. | 301/37.28 |
| 8,382,211 B2 * | 2/2013 | Renius et al. | 301/37.102 |
| 8,579,382 B2 * | 11/2013 | Peschiutta | 301/37.107 |
| 8,864,242 B2 * | 10/2014 | Mengle et al. | 301/37.107 |
| 2003/0047987 A1 * | 3/2003 | Enomoto et al. | 301/37.101 |
| 2003/0067212 A1 * | 4/2003 | Wrase et al. | 301/37.43 |
| 2004/0124693 A1 * | 7/2004 | Fitzgerald | 301/37.101 |
| 2004/0164606 A1 * | 8/2004 | Chase | 301/37.11 |
| 2008/0303338 A1 * | 12/2008 | Takeda et al. | 301/104 |
| 2009/0127920 A1 | 5/2009 | Takeda et al. | |
| 2010/0181821 A1 | 7/2010 | Noriega | |
| 2013/0026816 A1 * | 1/2013 | Kia et al. | 301/95.102 |
| 2013/0069422 A1 * | 3/2013 | Li | 301/104 |

FOREIGN PATENT DOCUMENTS

EP 222391 A1 * 5/1987

OTHER PUBLICATIONS

German Patent Office, German Search Report for Application No. 102011116359.3, dated Jun. 22, 2012.

* cited by examiner

*Primary Examiner* — Kip T Kotter
(74) *Attorney, Agent, or Firm* — Ingrassia Fisher & Lorenz PC

(57) ABSTRACT

A wheel for a motor vehicle is provided. The wheel includes at least one spoke, and a dovetail profile disposed on the spoke. The wheel also includes a spoke module with dovetail encompassing regions, which are configured to be pushed onto the dovetail profile.

20 Claims, 3 Drawing Sheets

EASILY MOUNTABLE SPOKE MODULE FOR THE SPOKES OF A WHEEL FOR MOTOR VEHICLES

CROSS-REFERENCE TO RELATED APPLICATION

This application claims priority to German Patent Application No. 10 2011 116 359.3, filed Oct. 19, 2011, which is incorporated herein by reference in its entirety.

TECHNICAL FIELD

This application pertains to a wheel for a motor vehicle where the wheel has spokes and spoke modules which can be disposed thereon.

BACKGROUND

DE 101 43 567 B4 discloses a wheel having a rim, a hub, and a plurality of spokes which connect the rim to the hub and having spoke modules fastened to the wheel, which each cover a spoke. The spoke modules can have catches which grip behind the rim, the hub, or the spokes.

Therefore, it may be desirable to provide a wheel with spokes and a spoke module which can be disposed thereon, which is easy to mount and in which the spoke module can be fixed positively on the spoke in the axial direction. In addition, other objects, desirable features and characteristics will become apparent from the subsequent summary and detailed description, and the appended claims, taken in conjunction with the accompanying drawings and this background.

SUMMARY

According to one exemplary embodiment, provided is a wheel for a motor vehicle. The wheel includes at least one spoke, and a dovetail profile disposed on the spoke. The wheel also includes a spoke module with dovetail encompassing regions, which are configured to be pushed onto the dovetail profile.

The dovetail profiles cooperate with the dovetail encompassing regions in the manner of a dovetail connection. The spoke modules are therefore held positively in the axial direction. The spoke module can be individually configured, for example, by a coloration and/or incorporated relief with logos and the like. The spoke modules can be arbitrarily exchanged by the end customer himself without needing to dismount the wheel.

In an advantageous further development, in a latching position an outer region of the spoke module comes to rest in a radially outwardly pointing direction on a collar of the wheel projecting axially over the spoke.

The collar projecting axially over the spoke can comprise the rim collar for a tire. During a rotation of the wheel, centrifugal forces act in the radial direction on the spoke module. Since the outer regions of the spoke modules are held in the radial direction by the projecting section of the wheel, the spoke modules cannot be moved outward from the latching position due to the centrifugal force. The spoke modules can thus be secured radially positively.

According to one exemplary embodiment, a plurality of dovetail profiles are disposed one behind the other along the spoke where insertion gaps for insertion of the dovetail encompassing regions are provided on the spoke.

By this means a stable connection can be made between a spoke and a spoke module with which a positive connection can still be achieved even when dovetail encompassing regions are broken off.

As a result, the spoke module need not be pushed over the entire length of the spoke but only from insertion gaps until the dovetail encompassing regions grip around the dovetail profiles.

According to one exemplary embodiment, parallel to the dovetail encompassing regions an elongated web extends from the spoke module in the direction of the spoke and rests on the spoke. The web can extend over the entire length of a flank of the spoke module.

The web terminates the spoke module toward the outside so that the dovetail connection remains concealed. The web can also prevent dirt from entering between the spoke and the spoke module.

In one exemplary embodiment, the web can hold the spoke module under pretension.

The dovetail encompassing region or regions disposed adjacent to the web are thereby loaded under tension. The dovetail encompassing region disposed opposite the web is loaded under compression. The clamping effect of the dovetail connection can be improved by the bending stress.

According to one exemplary embodiment, an elevation is provided on the spoke where a locking rib is provided on the spoke module, which locks the spoke module in a latching position.

As a result of the locking rib cooperating with the elevation, the spoke module is held in the latching position. The spoke module is therefore held in the axial direction by the dovetail profile and in the radial direction by the elevation.

According to one exemplary embodiment, the elevation and the locking rib are disposed in such a manner that the spoke module is locked in a radially inward pointing direction.

The locking forms a detachable connection which however during travel and generally during a rotation of the wheel should remain on the spoke. Since the detachable locking opens against the centrifugal force, an unintentional release of the spoke module is avoided.

According to one exemplary embodiment, the spoke module is bent at an inner region in the axial direction wherein in the mounted state an end region rests on the spoke and produces a pretension acting in the radial direction.

As a result, when locking the spoke module a resistance must be overcome in order to elastically deform the spoke module. The elastic pretension acts in the direction in which the spoke module must be pulled in order to release it. The elastic pretension is therefore generally lower than the releasing force required to release the locking.

According to one exemplary embodiment, the dovetail profile expands in a V-shape in a push-on direction. Accordingly the dovetail encompassing regions taper in the push-on direction.

As a result, a push-on distance to be covered during the fastening can be reduced.

According to one exemplary embodiment, the dovetail profile is formed from holding regions which have roundings.

As a result of the roundings, local stress peaks in the spoke can be avoided under mechanical stressing of the wheel. The so-called notch effect which can occur under mechanical stressing at transitions with small wheels cannot occur at the roundings.

A spoke module with dovetail encompassing regions, which are configured to grip around a dovetail profile disposed on the spoke during a displacement longitudinal to a spoke is suitable for covering a spoke of a wheel. The spoke module can be exchanged in a short time with relatively low effort in order to achieve individual optical designs.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

In the figures components which are the same or have functionally the same effect are provided with the same reference numbers.

Figure 1:
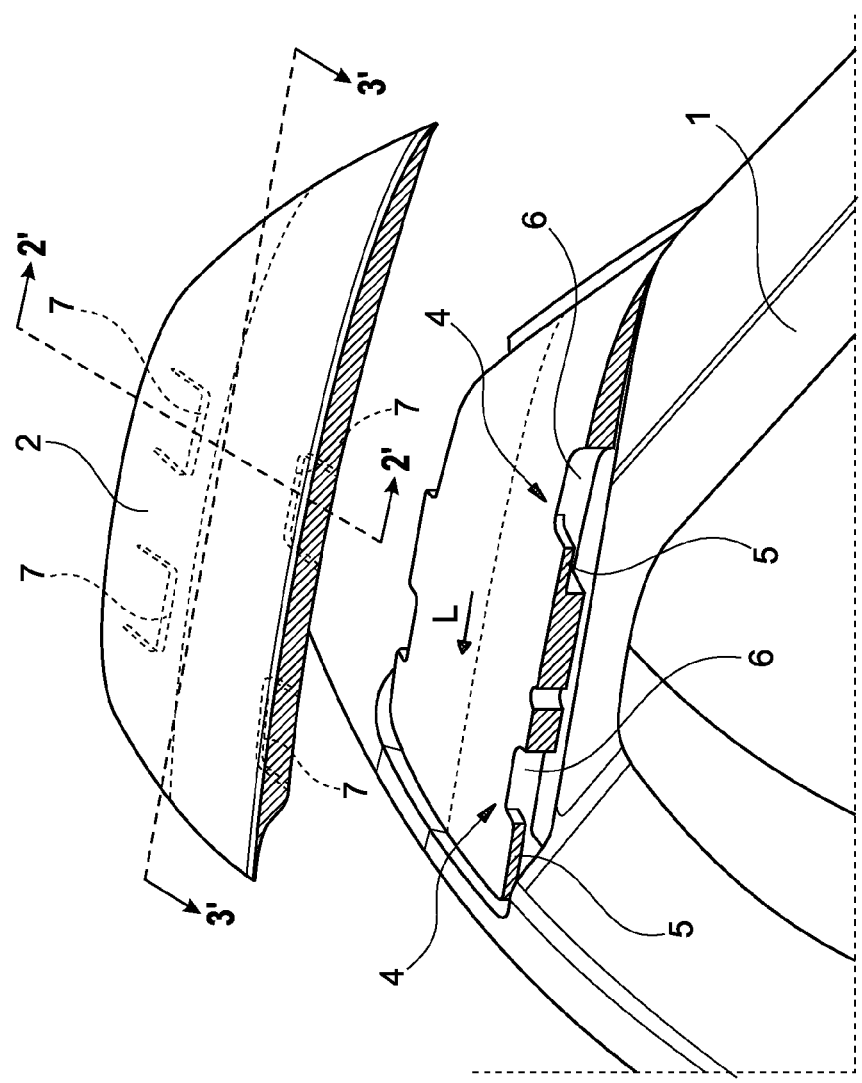
FIG. 1 shows from a perspective view a part of a wheel with a spoke and a rim collar, where a spoke module can be attached to the spoke.

FIG. 1 shows a part of a wheel with a spoke 1 and a spoke module 2 which can be disposed thereon. The spoke 1 connects a hub not shown to a rim collar 3. The spoke 1 generally comprises a light metal, for example, aluminum. The cover 2 can be made of plastic and painted. The spoke 1 is slightly inclined with respect to the radial r. Dovetail profiles 4 are provided on the spoke 1. The dovetail profiles 4 are formed by retaining regions 5 pointing away from one another.

The spoke 1 shown in FIG. 1 has two dovetail profiles 4. Insertion gaps 6 into which dovetail encompassing regions 7 disposed on the spoke module 2 can be inserted in axial direction a are disposed adjacent to both dovetail profiles 4. After insertion according to the alignment of the spoke 1, the spoke module 2 can be pushed outward in a substantially radial direction (push-on direction L) along the spoke 1 until the dovetail encompassing regions 7 engage with the retaining regions 5 of the dovetail profile.

Figure 2:
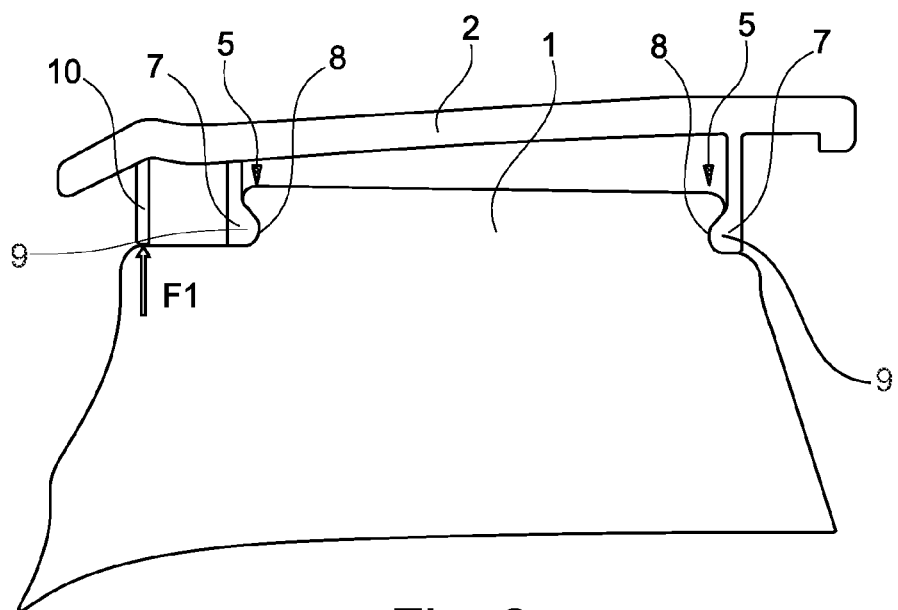
FIG. 2 shows in a sectional view a cross-section of a spoke with a spoke module disposed thereon.

FIG. 2 shows a spoke 1 with a spoke module 2 mounted thereon in a cutaway view along the line 2'-2'. It can be seen that the retaining regions 5 of the swallowtail profile have a rounding 8. During operation the spokes 1 transfer the wheel load to the hub not shown. Accordingly, relatively high compressive and tensile stresses act in the spoke 1. At sharp transitions or small radii, high stresses can result in high local stresses (notch effect). The notch effect can be avoided due to the rounding. Retaining lugs 9 engaging in the retaining regions 5, which are generally also configured to be rounded, are disposed on the swallowtail encompassing regions 7. For example, the geometric configuration of the retaining lugs 9 in the mounted state, taking into account a deformation by elastic pretension, corresponds to the retaining regions 5 such that the largest possible contact area is formed between the retaining lugs 9 and the retaining regions 5. As a result friction occurs between the retaining lugs 9 and the retaining region 5 during mounting, which is associated with a haptically high-quality impression.

In FIG. 2 a web 10 is provided on the left on the spoke module 2, which extends in the longitudinal direction of the spoke. The web 10 terminates the spoke module 2 toward the outside. In addition, in the mounted state the web 10 rests on the spoke 1 under slight pretension. A force F1 therefore acts on the spoke module 2 which slightly deforms the spoke module elastically. The pretension is produced by gently pressing during mounting and ensures a backlash-free and therefore rattle-free fit of the spoke module 2.

Figure 3:
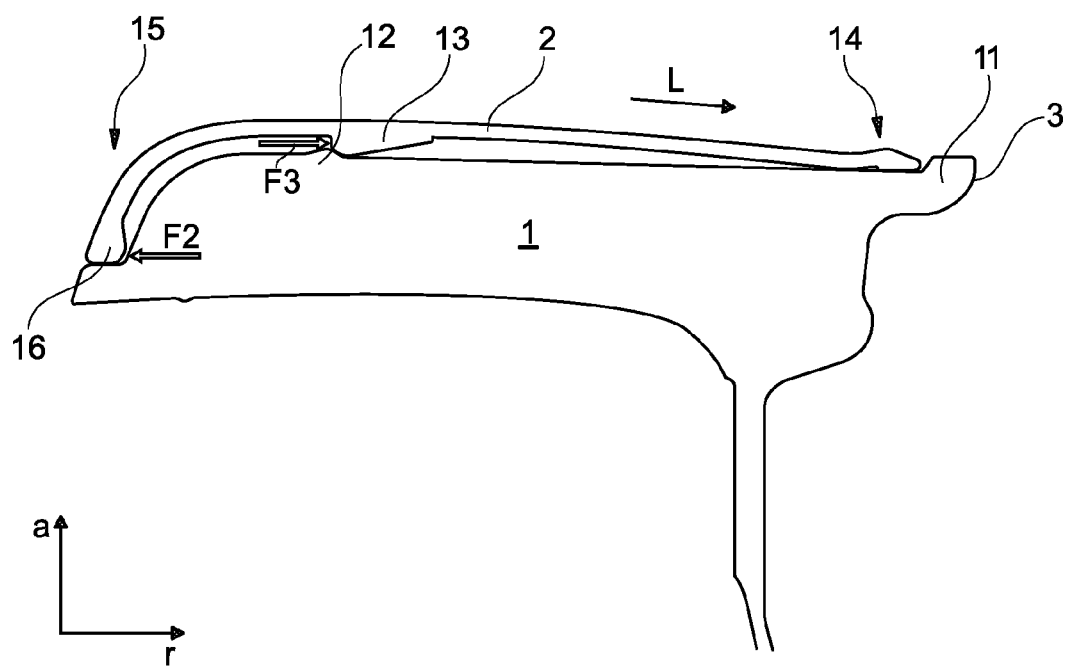
FIG. 3 shows in a sectional view a longitudinal section of a spoke with a spoke module disposed thereon.

FIG. 3 shows the spoke 1 with the spoke module 2 disposed thereon in a longitudinal section along the line 3'-3'. On the right, that is in the radial direction r, the spoke module 2 rests with an outer region 14 flush against a collar 11. The collar 11 is formed on a rim collar 3 and projects slightly in the axial direction a. During travel the wheel turns and a centrifugal force acts radially outward on the spoke module 2. The spoke module 2 can be supported on the collar 11.

FIG. 3 further shows a possible locking of the spoke module 2 on the spoke 1. The spoke 2 has an elevation over which a locking rib 13 is pushed during mounting. The locking rib 13 goes over the elevation 12 and engages on the right of the elevation so that the spoke module 2 is held substantially backlash-free in a latching position.

In an inner region 15 the spoke module 2 is bent inward in the axial direction a. In the mounted position shown, an end region 16 rests on the spoke and produces a pretension acting in the radial direction r. A force F2 therefore acts on the spoke module 2. The force F2 is compensated by a force F3 prevailing on the locking rib 13. As a result, the spoke module is held backlash-free in the radial direction r. The forces F2 and F3 are axially offset. The force F2 is only so large that the spoke module 2 is slightly deformed. The pretension must be overcome during mounting, for example, whereby the inner region 15 is acted upon by force with the ball of the hand.

Figure 4:
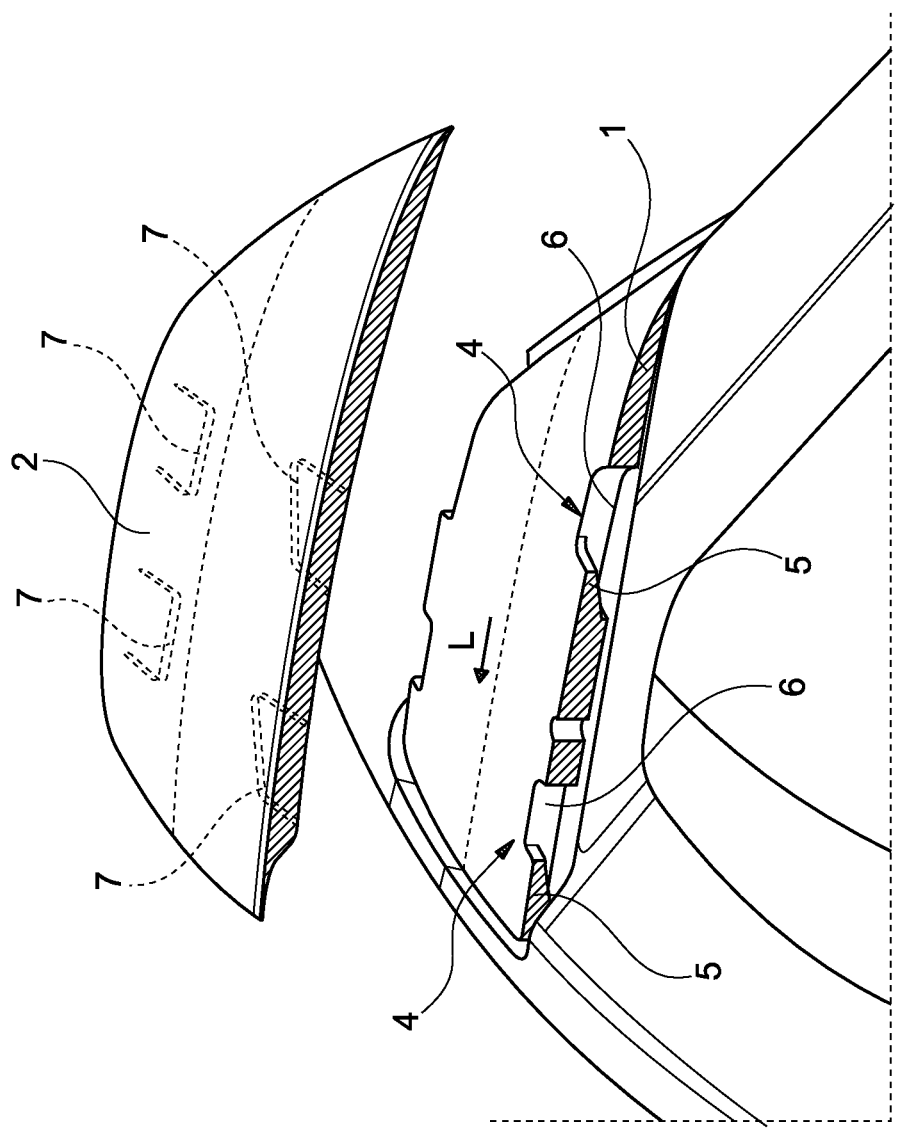
FIG. 4 shows from a perspective view a part of a wheel with a spoke and a rim collar where a spoke module with V-shaped dovetail encompassing regions can be attached to the spoke.

FIG. 4 shows a spoke 1 with V-shaped dovetail profiles 4 and dovetail encompassing regions 7 configured correspondingly to these. The retaining regions 5 are less deep in the push-on direction L. Accordingly, the dovetail encompassing regions 7 engage less deeply in the retaining regions 5 in the push-on direction L. As a result of this V-shaped configuration of the dovetail profiles 4, a push-on distance required to attach the spoke module 2 can be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:
1. A wheel for a motor vehicle, the wheel comprising:
   at least one spoke;
   a retaining region disposed on the spoke; and
   a spoke module having retaining lugs extending axially from an inner surface of the spoke module, the spoke module being positionable on the spoke in a radial direction from an unlatched position wherein the retaining lug is disengaged from the retaining region to a latching position wherein the retaining lug engages and grips around the retaining region to secure the spoke module to the spoke.

2. The wheel according to claim 1, where in the latching position, an outer region of the spoke module comes to rest in a radially outwardly pointing direction on a collar of the wheel projecting axially over the spoke.

3. The wheel according to claim 1, wherein a plurality of retaining regions are disposed one behind the other along the spoke and wherein insertion gaps for insertion of the retaining lugs are provided on the spoke.

4. The wheel according to claim 1, where parallel to the retaining lugs an elongated web extends from the spoke module in the direction of the spoke, wherein the web rests on the spoke in the latching position.

5. The wheel according to claim 4, wherein the web holds the spoke module under pretension.

6. The wheel according to claim 1, wherein an elevation is provided on the spoke and wherein a locking rib is provided on the spoke module, which locks the spoke module in the latching position.

7. The wheel according to claim 6, wherein the elevation and the locking rib are disposed in such a manner that the spoke module is locked in a radially inward pointing direction.

8. The wheel according to claim 1, wherein the spoke module is bent at an inner region in the axial direction and wherein in the latching position an end region rests on the spoke and produces a pretension acting in the radial direction.

9. The wheel according to claim 1, wherein the retaining region expands in a V-shape in a push-on direction and the retaining lugs taper in the push-on direction.

10. The wheel according to claim 1, wherein the retaining region is formed from holding regions, and the holding regions have roundings.

11. A motor vehicle, comprising:
a wheel having at least one spoke;
a retaining region disposed on the spoke; and
a spoke module with retaining lugs extending axially from an inner surface of the spoke module, the spoke module being positionable on the spoke in a radial direction from an unlatched position wherein the retaining lug is disengaged from the retaining region to a latching position wherein the retaining lug engages and grips around the retaining region to secure the spoke module to the spoke.

12. The motor vehicle according to claim 11, where in the latching position, an outer region of the spoke module comes to rest in a radially outwardly pointing direction on a collar of the wheel projecting axially over the spoke.

13. The motor vehicle according to claim 11, wherein a plurality of retaining regions are disposed one behind the other along the spoke and wherein insertion gaps for insertion of the retaining lugs are provided on the spoke.

14. The motor vehicle according to claim 11, where parallel to the retaining lugs an elongated web extends from the spoke module in the direction of the spoke, wherein the web rests on the spoke in the latching position.

15. The motor vehicle according to claim 14, wherein the web holds the spoke module under pretension.

16. The motor vehicle according to claim 11, wherein an elevation is provided on the spoke and wherein a locking rib is provided on the spoke module, which locks the spoke module in the latching position.

17. The motor vehicle according to claim 16, wherein the elevation and the locking rib are disposed in such a manner that the spoke module is locked in a radially inward pointing direction.

18. The motor vehicle according to claim 11, wherein the spoke module is bent at an inner region in the axial direction and wherein in the latching position an end region rests on the spoke and produces a pretension acting in the radial direction.

19. The motor vehicle according to claim 11, wherein the retaining region expands in a V-shape in a push-on direction and the retaining lugs taper in the push-on direction.

20. The motor vehicle according to claim 11, wherein the retaining region is formed from holding regions, and the holding regions have roundings.

* * * * *